US010239985B2

United States Patent
Adkins et al.

(10) Patent No.: US 10,239,985 B2
(45) Date of Patent: Mar. 26, 2019

(54) POLYMER POLYOLS COMPRISING A NATURAL OIL BASE POLYOL, POLYURETHANE FOAMS COMPRISING THESE POLYMER POLYOLS AND PROCESSES FOR THEIR PREPARATION

(75) Inventors: Rick L. Adkins, Dunbar, WV (US); Stanley L. Hager, Cross Lanes, WV (US); Brian L. Neal, Scott Depot, WV (US); Jack R. Reese, Hurricane, WV (US); Jiong England, Orange, CA (US); Micah N. Moore, Red House, WV (US)

(73) Assignee: COVESTRO LLC, Pittsburgh, PA (US)

( * ) Notice: Subject to any disclaimer, the term of this patent is extended or adjusted under 35 U.S.C. 154(b) by 281 days.

(21) Appl. No.: 12/317,563

(22) Filed: Dec. 23, 2008

(65) Prior Publication Data

US 2010/0160469 A1    Jun. 24, 2010

(51) Int. Cl.
| | | |
|---|---|---|
| C08G 18/48 | (2006.01) | |
| C08G 18/40 | (2006.01) | |
| C08G 18/63 | (2006.01) | |
| C08G 18/64 | (2006.01) | |
| C08G 18/76 | (2006.01) | |
| C08F 291/08 | (2006.01) | |
| C08G 101/00 | (2006.01) | |

(52) U.S. Cl.
CPC ........ C08G 18/4072 (2013.01); C08F 291/08 (2013.01); C08G 18/631 (2013.01); C08G 18/632 (2013.01); C08G 18/64 (2013.01); C08G 18/7621 (2013.01); C08G 18/7664 (2013.01); *C08G 2101/005* (2013.01); *C08G 2101/0008* (2013.01); *C08G 2101/0016* (2013.01); *C08G 2101/0083* (2013.01)

(58) Field of Classification Search
CPC ..................................... C08G 18/632
USPC .................................. 521/170, 174
See application file for complete search history.

(56) References Cited

U.S. PATENT DOCUMENTS

| | | | |
|---|---|---|---|
| 5,854,358 A | 12/1998 | Heinemann et al. | |
| 8,436,063 B2 | 5/2013 | Bartelink et al. | |
| 2007/0282029 A1* | 12/2007 | Hager et al. | 521/172 |
| 2010/0096768 A1 | 4/2010 | Sasaki et al. | |
| 2018/0112394 A1* | 4/2018 | Giles | E04B 1/7629 |

FOREIGN PATENT DOCUMENTS

| | | |
|---|---|---|
| EP | 1624006 A1 | 2/2006 |
| EP | 1762578 A1 | 2/2006 |
| WO | 2006065345 A1 | 6/2006 |
| WO | 2007111834 A2 | 10/2007 |

* cited by examiner

*Primary Examiner* — Michael F Pepitone
(74) *Attorney, Agent, or Firm* — N. Denise Brown

(57) ABSTRACT

This invention relates to polymer polyols comprising the free-radical polymerization product of a base polyol, at least one ethylenically unsaturated monomer, and, optionally, a preformed stabilizer, in the presence of at least one free-radical polymerization initiator and at least one chain transfer agent, in which the base polyol is a natural oil. A process for preparing these polymer polyols is also described. The present invention also relates to a polyurethane foam prepared from these polymer polyols and to a process for the preparation of these polyurethane foams.

20 Claims, No Drawings

POLYMER POLYOLS COMPRISING A NATURAL OIL BASE POLYOL, POLYURETHANE FOAMS COMPRISING THESE POLYMER POLYOLS AND PROCESSES FOR THEIR PREPARATION

BACKGROUND OF THE INVENTION

This invention relates to polymer polyols that are the free-radical polymerization product of a base polyol, at least one ethylenically unsaturated monomer, and optionally, a preformed stabilizer, in the presence of at least one free-radical polymerization initiator and at least one chain transfer agent, in which the base polyol is comprised of a natural oil. A process for preparing these polymer polyols is also described. The present invention also relates to a polyurethane foam prepared from these polymer polyols and to a process for the preparation of these polyurethane foams.

U.S. Pat. No. 5,854,358 describes the polymerization of monomers in the presence of a polyol and a castor oil-polyol product. More specifically, this reference describes stable, low viscosity, graft copolymer dispersions prepared by free-radically polymerizing a reaction mixture comprising one or more olefinic monomers, one or more basic polyols and one or more hydroxyl compounds which are modified with castor oil, in the presence of a free-radical catalyst. These hydroxyl compounds modified with castor oil have molecular weights of 6000 to 100,000 g/mole and functionalities of 2 to 6 and are prepared from an excess of castor oil with a polyol such that the molar ratio of castor oil to hydroxyl group containing compounds is 1.1:1 to 10:1. The use of an excess of castor oil gives active modified hydroxyl compounds. The molecular weights of these modified hydroxyl compounds can be increased by adding one or more carboxylic acids which are at least difunctional, or one or more carboxylic acids derivatives during the modification reaction to give molecular weights of 7000 to 100,000 g/mol.

WO 2006/065345 also discloses polymer polyols and polymer dispersions prepared from vegetable-oil based hydroxyl-containing materials. These polymer polyols have a polyol continuous phase and dispersed polymer particles, in which the polyol continuous phase includes at least one hydroxymethyl-containing polyester polyol which is derived from a fatty acid or a fatty acid ester. In particular, these hydroxymethyl-containing polyester polyols are prepared by reacting a hydroxymethyl group-containing fatty acid having from 12 to 26 carbon atoms, or an ester thereof, with an alcohol or amine initiator compound having an average of at least one hydroxyl or primary/second amine group per molecule. The resultant hydroxymethyl polyester polyol contains an average of at least 1.3 repeating units derived from hydroxymethyl-group-containing fatty acid or ester per total number of hydroxyl, primary/secondary amine groups in the initiator compound and has an equivalent weight of at least 400 to 15,000.

Advantages of the present invention include an efficient process for producing stable and low viscosity polymer polyols with a high renewable content that can be substituted for largely petrochemical based polymer polyols in the manufacture of high quality urethane foams. This substitution can help to conserve scarce petroleum reserves and offers other environmental benefits such as lower energy usage and reduced carbon dioxide emissions. These natural oil based polymer polyols provide another means for raising the renewable content of flexible and semirigid polyurethane foams beyond what would be possible through the use of only renewable base polyols. This would be particularly advantageous for incorporating more renewable content into higher firmness foams that are typically produced with high levels of polymer polyols and low amounts of base polyols.

SUMMARY OF THE INVENTION

The present invention relates to polymer polyols comprising the free-radical polymerization product of:
(1) a base polyol selected from the group consisting of:
  (a) one or more natural oils which naturally contains at least one hydroxyl group,
  (b) one or more hydroxylated derivatives of one or more natural oils,
  (c) one or more polyols which comprise the alkoxylation product of one or more natural oils which naturally contain at least one hydroxyl group with one or more alkylene oxides,
  (d) one or more polyols which comprise the alkoxylation product of one or more hydroxylated derivatives of one or more natural oils with one or more alkylene oxides, and
  (e) mixtures thereof;
(2) at least one ethylenically unsaturated monomer,
and, optionally,
(3) a preformed stabilizer,
in the presence of
(4) at least one free-radical polymerization initiator,
and, optionally,
(5) one or more chain transfer agents.

The present invention also relates to a process for preparing these polymer polyols. This process comprises (A) free-radically polymerizing (1) a base polyol as described above, (2) at least one ethylenically unsaturated monomer, and, optionally, (3) a preformed stabilizer, in the presence of (4) at least one free-radical polymerization initiator, and, optionally, (5) one or more chain transfer agents.

The present invention also relates to a polyurethane foam which comprises the reaction product of (I) at least one polyisocyanate component, with (II) an isocyanate-reactive component which comprises the above described polymer polyol, in the presence of (III) at least one blowing agent and (IV) at least one catalyst.

In addition, this invention relates to a process for the preparation of these polyurethane foams. This process comprises reacting (I) at least one polyisocyanate component, with (II) an isocyanate-reactive component which comprises the above described polymer polyol, in the presence of (III) at least one blowing agent and (IV) at least one catalyst.

DETAILED DESCRIPTION OF THE INVENTION

As used herein, the following terms shall have the following meanings.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH = (56.1 \times 1000)/\text{Eq. Wt.}$$

wherein:
OH: represents the hydroxyl number of the polyol,
Eq. Wt. represents the average equivalent weight of the polyol.

As used herein, the functionality of the polyol represents the average functionality of the polyol, i.e. the average number of hydroxyl groups per molecule.

As used herein, the term molecular weight refers to the number average molecular weight unless indicated otherwise.

The term "natural oil" is defined as a starting material that is not derived from petroleum but as a starting material derived from a plant including the fruits, nuts and/or seeds of plants, any other naturally occurring vegetable oil, animal fats and/or oils, or any other non-petroleum derived oil. These naturally derived materials are environmentally friendly and biologically based materials. Thus, these starting materials are also frequently called "bio-based" materials or "natural oil" materials.

Polyols, including base polyols, prepared from these various non-petroleum sources as identified above are frequently referred to as "renewable resource based polyols", "bio-based polyols", "biopolyols" and/or "natural oil polyols". While some renewable resource materials, such as castor oil, contain naturally occurring hydroxyl groups, most natural oils must be converted to the hydroxyl containing polyols by chemical processes such as hydroxylation, epoxidation, ozonolysis, hydroformylation/hydrogenation or other suitable processes.

The term "ethylenically unsaturated monomer" means the simple unpolymerized form of a chemical compound having relatively low molecular weight, e.g., acrylonitrile, styrene, methyl methacrylate, and the like.

The phrase "free radically polymerizable ethylenically unsaturated monomer" means a monomer containing ethylenic unsaturation (>C=C<, i.e. two double bonded carbon atoms) that is capable of undergoing free radically induced addition polymerization reactions.

The term pre-formed stabilizer is defined as an intermediate obtained by reacting a macromer containing reactive unsaturation (e.g. acrylate, methacrylate, maleate, etc.) with monomers (i.e. acrylonitrile, styrene, methyl methacrylate, etc.), optionally, in a polymer control agent, PCA, (i.e. methanol, isopropanol, toluene, ethylbenzene, etc.) and/or optionally, in a polyol, to give a co-polymer (dispersion having e.g. a low solids content (e.g. <20%), or soluble grafts, etc.).

The term "stability" means the ability of a material to maintain a stable form such as the ability to stay in solution or in suspension.

The phrase "polymer polyol" refers to such compositions which can be produced by polymerizing one or more ethylenically unsaturated monomers dissolved or dispersed in a polyol in the presence of a free radical catalyst to form a stable dispersion of polymer particles in the polyol. These polymer polyols have the valuable property of imparting to, for example, polyurethane foams and elastomers produced therefrom, higher load-bearing properties than are provided by the corresponding unmodified polyols.

As used herein "viscosity" is in centistokes (cSt) measured at 25° C. on a Cannon Fenske or other suitable viscometer.

Suitable polyols to be used as the base polyol, i.e. component (1), in the present invention include those base polyols selected from the group consisting of:
(a) one or more natural oils which naturally contains at least one hydroxyl group,
(b) one or more hydroxylated derivatives of one or more natural oils,
(c) one or more polyols which comprise the alkoxylation product of one or more natural oils which naturally contains at least one hydroxyl group with one or more alkylene oxides,
(d) one or more polyols which comprise the alkoxylation product of one or more hydroxylated derivatives of one or more natural oils with one or more alkylene oxides; and
(e) mixtures thereof.

In accordance with the present invention, (a) one or more natural oils which naturally contains at least one hydroxyl group are suitable to be used as the base polyol of the polymer polyols herein. Natural oils that naturally contain at least one hydroxyl group include but are not limited to castor oil, lesquerella oil, etc.

Also suitable for use as the base polyol of the present invention are (b) one or more hydroxylated derivates of one or more natural oils. These hydroxylated derivatives of one or more natural oils typically have a functionality of greater than or equal to one, preferably greater than or equal to two and more preferably greater than or equal to 2.5; and an OH number of 10 to 400 and preferably 20 to 200. These hydroxylated derivatives typically have a molecular weight of greater than or equal to 200, preferably greater than or equal to 400 and more preferably greater than or equal to 600. The hydroxylated derivatives also typically have a molecular weight of less than 20,000, preferably less than 10,000 and more preferably less than 6000. In accordance with the present invention, these hydroxylated derivatives of one or more natural oils may have a molecular weight ranging between any combination of these upper and lower values, inclusive unless specified otherwise, e.g. from greater than or equal to 200 to less than 20,000, preferably from greater than or equal to 400 to less than 10,000, and more preferably from greater than or equal to 600 to less than 6000.

As used herein, hydroxylated means to introduce and/or increase the number of hydroxyl (i.e. OH) groups present in the molecule. Such hydroxylated derivatives of a natural oil are prepared by air oxidation, ozonolysis, the use of peroxides, by hydroformylation, enzymic processes, catalytic ring opening of epoxides, etc. Also, included herein is the chemical conversion of naturally occurring epoxy groups to hydroxyl groups. Other suitable processes for preparing hydroxylated derivatives of one or more natural oils to be used herein are described in, for example, U.S. Published Patent Applications 2006/0264524, 2006/0240194, 2006/0235100 and 2006/0041157, the disclosures of which are hereby incorporated by reference, and U.S. Pat. Nos. 6,433,121, 6,686,435, 6,891,053 and 7,084,230, the disclosures of which are hereby incorporated by reference.

Suitable natural oils to be hydroxylated include both the natural oils which naturally contain at least one hydroxyl group and the natural oils which do not naturally contain at least one hydroxyl group.

Natural oils that naturally contain at least one hydroxyl group include, for example, castor oil, lesquerella oil, etc. Suitable natural oils that do not naturally contain at least one hydroxyl group include but are not limited to soybean oil, canola oil, sunflower oil, corn oil, linseed oil, poppy seed oil, cottonseed oil, tung oil, palm oil, peanut oil, fish oil, olive oil, safflower oil, rapeseed oil, coconut oil, etc. Vernonia oil is an example of a suitable natural oil which contains epoxy groups that can be chemically converted to hydroxyl groups.

The natural oil polyols also may be subjected to other chemical processes during their manufacture that do not lead to hydroxyl group formation. For example, they may be hydrogenated to remove part or all of the naturally occurring unsaturation. Natural oil polyols that have undergone such chemical processes in their manufacture are included in this invention.

In accordance with the present invention, it is also possible to use (c) one or more polyols which comprise the alkoxylation product of one or more natural oil polyols with one or more alkylene oxides as the base polyol of the novel polymer polyols herein. These alkoxylated derivatives of one or more natural oil polyols typically have a hydroxyl functionality of greater than or equal to one, preferably greater than or equal to two and more preferably greater than or equal to 2.5, and an OH number of 20 to 400 and preferably 30 to 200. These alkoxylated derivatives typically have a molecular weight of greater than or equal to 200, preferably greater than or equal to 700 and more preferably greater than or equal to 1000. The alkoxylated derivatives also typically have a molecular weight of less than 20,000, preferably less than 10,000 and more preferably less than 6000. These alkoxylated derivatives of one or more natural oils may have a molecular weight ranging between any combination of these upper and lower values, inclusive unless specified otherwise, e.g. from greater than or equal to 200 to less than 20,000, preferably from greater than or equal to 700 to less than 10,000, and more preferably from greater than or equal to 1000 to less than 6000.

These alkoxylated derivatives of a natural oil are prepared by reacting a natural oil polyol with an alkylene oxide in the presence of a suitable catalyst. Suitable catalysts herein include DMC catalysts which are known. Preferred DMC catalysts and processes for their preparation are described in, for example, U.S. Pat. No. 5,482,908, the disclosure of which is hereby incorporated by reference. It may also be possible to use alkaline catalysts such as KOH. Amines are also suitable catalysts for this process.

Suitable alkylene oxides include ethylene oxide, propylene oxide, butylene oxide, styrene oxide, etc., and mixtures thereof. As is known in the art, alkylene oxides can be used simultaneously or sequentially. Ethylene oxide and/or propylene oxide are preferred. In accordance with the present invention, these alkoxylated derivatives of a natural oil can be prepared by the processes as described in, for example, U.S. Published Patent Applications 2006/0167125, 2006/0229375, 2007/0238798, 2007/0282117, 2008/0114086 and 2008/0139685, the disclosures of which are hereby incorporated by reference.

Suitable natural oils to be alkoxylated include both the natural oils which naturally contain at least one hydroxyl group and the natural oils that do not naturally contain one or more hydroxyl groups, but have been hydroxylated by a suitable process to provide one or more hydroxyl groups for alkoxylation. Natural oils that naturally contain at least one hydroxyl group include, for example, castor oil, lesquerella oil, etc. Examples of such natural oils that are naturally free of one or more hydroxyl groups include but are not limited to soybean oil, canola oil, cashew nutshell oil, sunflower oil, corn oil, linseed oil, poppy seed oil, cottonseed oil, tung oil, palm oil, peanut oil, fish oil, olive oil, safflower oil, rapeseed oil, coconut oil, etc.

In accordance with the present invention, it is also possible to use (d) one or more polyols which comprise the alkoxylation product of one or more hydroxylated derivatives of a natural oil with one or more alkylene oxides as the base polyol of the novel polymer polyols herein. These alkoxylated derivatives of one or more hydroxylated derivatives of a natural oil typically have a functionality of greater than or equal to one, preferably greater than or equal to two and more preferably greater than or equal to 2.5; and an OH number of 20 to 400 and preferably 30 to 200; and a molecular weight of greater than or equal to 200, preferably greater than or equal to 700 and more preferably greater than or equal to 1000. The polyols which comprise the alkoxylation product of one or more hydroxylated derivatives of a natural oil with one or more alkylene oxides also typically have a molecular weight of less than 20,000, preferably less than 10,000 and more preferably less than 6000. In general, these polyols may have a molecular weight ranging between any combination of these upper and lower values, inclusive unless specified otherwise, e.g. from greater than or equal to 200 to less than 20,000, preferably from greater than or equal to 700 to less than 10,000, and more preferably from greater than or equal to 1000 to less than 6000.

These alkoxylated derivatives of a hydroxylated derivative of a natural oil are prepared by reacting a hydroxylated derivative of a natural oil with an alkylene oxide in the presence of a suitable catalyst. Suitable catalysts here include DMC catalysts and standard alkaline catalysts. DMC catalysts are preferred. Suitable alkylene oxides include ethylene oxide, propylene oxide, butylene oxide, styrene oxide, or epichlorohydrin, etc., and mixtures thereof. As is known in the art, alkylene oxides can be used simultaneously or sequentially. Ethylene oxide and/or propylene oxide are preferred. In accordance with the present invention, suitable alkoxylated derivatives of a hydroxylated derivative of a natural oil can be prepared by the processes as described in, for example U.S. Published Patent Applications 2006/0167125, 2006/0229375, 2007/0238798, 2007/0282117, 2008/0114086 and 2008/0139685, the disclosures of which are hereby incorporated by reference.

Suitable hydroxylated derivatives of natural oils to be alkoxylated include the hydroxylated derivatives of both the natural oils that naturally contain at least one hydroxyl group and the natural oils that do not naturally contain at least one hydroxyl group. Such hydroxylated derivatives of natural oils which do not naturally contain at least one hydroxyl group are described above in component (b). Suitable examples of natural oils that naturally contain at least one hydroxyl group include, for example, castor oil, lesquerella oil, etc. Examples of such natural oils that are naturally free of one or more hydroxyl groups include but are not limited to soybean oil, canola oil, cashew nutshell oil, sunflower oil, corn oil, linseed oil, poppy seed oil, cottonseed oil, tung oil, palm oil, peanut oil, fish oil, olive oil, safflower oil, rapeseed oil, coconut oil, etc.

In addition, mixtures of one or more of (a), (b), (c) and/or (d) may be used as the base polyol in accordance with the present invention.

In accordance with the present invention, the base polyol of the polymer polyols will typically contain greater than or equal to 5% by weight, preferably greater than or equal to 10% by weight and more preferably greater than or equal to 20% by weight of a natural oil polyol as described hereinabove. The base polyol of these polymer polyols will also typically contain 100% by weight or less, preferably 80% by weight or less and more preferably 60% by weight of less of a natural oil polyol as described hereinabove. In general, the base polyol component herein may contain an amount of natural oil polyol ranging between any combination of these upper and lower values, inclusive unless specified otherwise, e.g. from greater than or equal to 5% to 100% by weight, preferably from greater than or equal to 10% to 80% by weight or less, and more preferably from greater than or equal to 20% to 60% by weight or less.

It is also possible for the base polyol to contain a portion of one or more conventional polyether polyols, polyester polyols, polybutadiene polyols, polycaprolactones, polythioethers, polycarbonates, polyacetals, etc. Details on the total amount of natural oil polyol(s) present are set forth above.

Preformed stabilizers are optional in accordance with the present invention. It is, however, preferred that a preformed stabilizer is present in the polymer polyols and process of preparing these polymer polyols. Suitable preformed stabilizers include, for example, those which are known in the art and include without limitation those described in the references discussed herein. Preferred preformed stabilizers include those discussed in, for example, U.S. Pat. No. 4,148,840 (Shah), U.S. Pat. No. 5,196,476 (Simroth), U.S. Pat. No. 5,364,906 (Critchfield) U.S. Pat. No. 5,990,185 (Fogg), U.S. Pat. No. 6,013,731 (Holeschovsky et al), U.S. Pat. No. 6,455,603 (Fogg), and U.S. Pat. No. 7,179,882 (Adkins et al), the disclosures of which are hereby incorporated by reference.

Suitable preformed stabilizers herein include those so-called intermediate obtained by reacting a macromolecule with one or more monomers (i.e. acrylonitrile, styrene, methyl methacrylate, etc.), to give a copolymer (dispersion having a low solids content, e.g. <25% or soluble grafts, etc.). The macromolecule may be obtained by linkage of polyether polyols through coupling with a material such as a polyisocyanate, epoxy resin, etc. or by other means to produce a high molecular weight polyol. The macromolecule preferably contains reactive unsaturation and is, in general, prepared by the reaction of the selected reactive unsaturated compound with a polyol. The terminology "reactive unsaturated compound," refers to any compound capable of forming an adduct with a polyol, either directly or indirectly, and having carbon-to-carbon double bonds which are adequately reactive with the particular monomer system being utilized. More specifically, compounds containing alpha, beta unsaturation are preferred. Suitable compounds satisfying this criteria include the maleates, fumarates, acrylates, and methacrylates. While not alpha, beta unsaturated compounds, polyol adducts formed from substituted vinyl benzenes, such as chloromethylstyrene, likewise may be utilized. Illustrative examples of suitable alpha, beta unsaturated compounds which may be employed to form the precursor stabilizer include maleic anhydride, fumaric acid, dialkyl fumarates, dialkyl maleates, glycol maleates, glycol fumarates, isocyanatoethyl methacrylate, 1,1-dimethyl-m-isopropenylbenzyl-isocyanate, methyl methacrylate, hydroxyethyl methacrylate, acrylic and methacrylic acid and their anhydride, methacroyl chloride and glycidyl methacrylate. The level of ethylenic unsaturation in the precursor stabilizer may vary widely. The minimum and maximum levels of unsaturation both are constricted by the dispersion stability that the precursor stabilizer is capable of imparting to the polymer polyol composition. The specific level of unsaturation utilized further will depend on the molecular weight and functionality of the polyol used to prepare the precursor stabilizer. Optionally, a diluent, polymer control agent or chain transfer agent (i.e. molecular weight regulator) may also be present.

Typically, the preformed stabilizer of the invention is derived from:
(a) a macromolecule, macromer or other suitable precursor stabilizer;
(b) a free radically polymerizable ethylenically unsaturated monomer, preferably acrylonitrile and at least one other ethylenically unsaturated comonomer copolymerizable therewith;
(c) a free radical polymerization initiator;
(d) optionally, a chain transfer agent in which (a), (b), and (c) are soluble, but in which the resultant preformed stabilizer is essentially insoluble;
and/or
(e) optionally, one or more polyols.

In general, the amount of the components, on a weight percent of the total formulation, for forming preformed stabilizer is as follows:
(a) 10 to 40, more preferably 15 to 35;
(b) 10 to 30, more preferably 15 to 25;
(c) 0.1 to 2, more preferably 0.1 to 2;
(d) 30 to 80, more preferably 40 to 70;
and
(e) 0 to 20, more preferably 0 to 10.

In the formulations proposed above for the preformed stabilizer, the %'s by weight of components (a), (b), (c), and optionally (d), and optionally (e), totals 100% by weight of the preformed stabilizer component (3).

Suitable preformed stabilizers for the present invention include those comprising the free radical polymerization product of a free radically polymerizable ethylenically unsaturated monomer, and an adduct of a alcohol having the average formula:

$$A(OROX)_{\geq 1}$$

wherein A is a polyvalent organic moiety, the free valence of which is $\geq 1$, R is the divalent residue comprising an alkylene oxide moiety, and X is one or more of an organic moiety containing reactive unsaturation, copolymerizable with A, and hydrogen, about one of such X is the organic moiety containing reactive unsaturation and the remaining X's are hydrogen, in which the adduct may be further adducted with an organic polyisocyanate.

Suitable compounds to be used as the macromolecule, the macromer or the precursor stabilizer (i.e. component (a) above) include, for example, compounds which contain reactive unsaturation (e.g. acrylate, methacrylate, maleate, fumarate, isopropenylphenyl, vinyl silyl, etc.), obtained by reacting compounds containing reactive unsaturation with alcohols having the average formula $A(OROX)_{\geq 1}$. Examples include but are not limited to, maleic anhydride, fumaric acid, dialkyl fumarates, dialkyl maleates, glycol maleates, glycol fumarates, isocyanatoethyl methacrylate, methyl methacrylate, hydroxyethyl methacrylate, acrylic and methacrylic acid and their anhydride, methacryl chloride, and glycidyl methacrylate, vinylmethoxysilane, etc.

The reactive unsaturated compound may also be the reaction product of, for example, hydroxymethyl or hydroxyethyl methacrylate with a polyol by coupling through use of an organic polyisocyanate as described in U.S. Pat. No. 4,521,546, the disclosure of which is herein incorporated by reference, or by reaction with an unsaturated mono-isocyanate such as, for example, 1,1-dimethyl-m-isopropenylbenzyl isocyanate, etc. Other suitable precursor stabilizers compounds are obtained by reacting a silicon atom containing compound with a polyether polyol, as described in U.S. Pat. No. 4,883,832 (Cloetens et al), the disclosure of which is herein incorporated by reference.

Suitable compounds to be used component (b) above, include reactive unsaturated compounds, particularly those that are free radically polymerizable. Some examples of suitable compounds include aliphatic conjugated dienes, monovinylidene aromatic monomers, α,β-ethylenically unsaturated carboxylic acids and esters thereof, α,β-ethylenically unsaturated nitriles and amides, vinyl esters, vinyl ethers, vinyl ketones, vinyl and vinylidene halides and a wide variety of other ethylenically unsaturated materials which are copolymerizable with the aforementioned monomeric adduct or reactive monomer. Such monomers are known in polymer polyol chemistry. Mixtures of two or more of such monomers are suitable herein.

Preferred monomers are the monovinylidene aromatic monomers, particularly styrene, and the ethylenically unsaturated nitrites, particularly acrylonitrile. In particular, it is preferred to utilize acrylonitrile with a comonomer and to maintain a minimum of about 5 to 15 percent by weight acrylonitrile in the system. Styrene is generally preferred as the comonomer, but other monomers may be employed. A most preferred monomer mixture comprises acrylonitrile and styrene. The weight proportion of acrylonitrile can range from about 20 to 80 weight percent of the comonomer mixture, more typically from about 25 to about 55 weight percent, and styrene can accordingly vary from about 80 to about 20 weight percent, more preferably from 75 to 45 weight percent of the mixture.

The free radical polymerization initiators suitable for use as component (c) in the suitable preformed stabilizers of the present invention encompass any free radical catalyst suitable for grafting of an ethylenically unsaturated polymer to a polyol. Examples of suitable free-radical polymerization initiators for the present invention include initiators such as, for example, peroxides including both alkyl and aryl hydroperoxides, persulfates, perborates, percarbonates, azo compounds, etc. Such catalysts are known in polymer polyol chemistry. Also useful are catalysts having a satisfactory half-life within the temperature ranges used to form the preformed stabilizer, i.e. the half-life should be about 25 percent or less of the residence time in the reactor at a given temperature.

Suitable catalysts concentrations range from about 0.01 to about 2% by weight, preferably from about 0.05 to 1% by weight, and most preferably 0.05 to 0.3% by weight, based on the total weight of the components (i.e. 100% by weight of the PFS). The particular catalyst concentration selected will usually be an optimum value considering all factors, including costs.

In accordance with the present invention, a polymer control agent (d) in which components (a), (b), and (c) of the pre-formed stabilizer are soluble, but in which the resultant preformed stabilizer component is essentially insoluble, is optional. When present, this may be one polymer control agent or a mixture of polymer control agents. Suitable compounds to be used as polymer control agents in accordance with the present invention include various monopoles (i.e. monohydroxy alcohols), aromatic hydrocarbons, ethers, and other liquids. Monools are preferred because of their ease of stripping from the composition. The choice of mono-ol is not narrowly critical, but it should not form two phases at reaction conditions and it should be readily stripped from the final polymer/polyol.

The polyol components suitable as component (e) in the present invention include typically the alkylene oxide adduct of $A(OH)_{\geq 3}$ described above. Though the polyol used as component (e) can encompass the variety of polyols described above, including the broader class of polyols described in U.S. Pat. No. 4,242,249, at column 7, line 39 through column 9, line 10, the disclosure of which is herein incorporated by reference, it is preferred that the polyol component (e) be the same as or equivalent to the polyol used in the formation of precursor used in preparing the preformed stabilizer (PFS). Typically, the polyol need not be stripped off.

Because of the number of components, the variability of their concentration in the feed, and the variability of the operating conditions of temperature, pressure, and residence or reaction times, a substantial choice of these is possible while still achieving the benefits of the invention. Therefore, it is prudent to test particular combinations to confirm the most suitable operating mode for producing a particular final polymer polyol product.

The process for producing the preformed stabilizer is similar to the process for making the polymer polyol. The temperature range is not critical and may vary from about 80° C. to about 150° C. or perhaps greater, the preferred range being from 115° C. to 125° C. The catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.—a stirred flask or stirred autoclave). The reactors of this type keep the reaction mixture relatively homogeneous and so prevent localized high monomer to macromer ratios such as occur in tubular reactors, where all of the monomer is added at the beginning of the reactor.

The preformed stabilizer of the present invention comprise dispersions in the diluent and any unreacted monomer in which the preformed stabilizer is probably present as individual molecules or as groups of molecules in "micelles," or on the surface of small polymer particles.

Suitable compounds to be used as the ethylenically unsaturated monomers, i.e. component (2) the present invention include, for example, those ethylenically unsaturated monomers which are known to be useful in polymer polyols. Suitable monomers include, for example, aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitrites, particularly acrylonitrile are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred that styrene and acrylonitrile are used in sufficient amounts such that the weight ratio of styrene to acrylonitrile (S:AN) is from about 80:20 to 40:60, more preferably from about 75:25 to 60:40. These ratios are suitable for polymer polyols and the processes of preparing them, regardless of whether they comprise the ethylenically unsaturated macromers or the pre-formed stabilizers of the present invention.

Overall, the quantity of ethylenically unsaturated monomer(s) present in the polymer polyols comprising a pre-formed stabilizer is at least about 20% by weight, preferably at least about 30% by weight, more preferably at least about 40% by weight, and most preferably at least about 45% by weight, based on 100% by weight of the polymer polyol. The quantity of ethylenically unsaturated monomer(s) present in the polymer polyols is about 65% by weight or less, preferably about 60% by weight or less, more preferably about 59% by weight of less, most preferably about 58% by weight or less and most particularly preferably about 55% by weight or less. The polymer polyols of the present invention typically has a solids content ranging between any combination of these upper and lower values, inclusive, e.g. from 20% to 65% by weight, preferably from 30% to 60% by weight, more preferably from 40% to 59% by weight, most preferably from 45% to 58% by weight, and most particularly preferably from 45% to 55% by weight, based on the total weight of the polymer polyol.

Suitable free-radical initiators to be used as component (4) in the present invention include, for example, those which are known to be suitable for polymer polyols. Examples of suitable free-radical polymerization initiators for the present invention include initiators such as, for example, peroxides including both alkyl and aryl hydroperoxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Useful initiators also include, for example, those catalysts having a satisfactory half-life within the temperature ranges used in forming the polymer polyol. Typically, the half-life of the catalyst should be about 25% or less of the residence time in the reactor at any given time. Preferred initiators for this portion of the invention include acyl peroxides such as didecanoyl peroxide and dilauroyl peroxide, alkyl peroxides such as t-butyl peroxy-2-ethylhexanoate, t-butylperpivalate, t-amyl peroxy pivalate, t-amyl peroctoate, 2,5-dimethylhexane-2,5-di-per-2-ethyl hexoate, t-butyl perneodecanoate, t-butylperbenzoate and 1,1-dimethyl-3-hydroxybutyl peroxy-2-ethylhexanoate, and azo catalysts such as azobis (isobutyronitrile), 2,2'-azo bis-(2-methoxyl-butyronitrile), and mixtures thereof. Most preferred are the acyl peroxides described above and the azo catalysts. A particularly preferred initiator comprises azobis(isobutyronitrile).

Particularly preferred in the practice of the invention, are the use of azo catalysts and the aforementioned acyl peroxides of the above formula. The preferred acyl peroxides include those which have the unique advantage of effecting the desired degree of polymerization essentially without raising the viscosity of the polymer polyol over that obtained with the azo catalyst. This enhances one's ability to achieve higher solids polymer polyols with good product stability without raising product viscosity. Such acyl peroxides can be used in molar amounts substantially less than the amounts required when using other free radical catalysts in forming the polymer polyols.

Generally speaking, peroxide initiators result in the formation of little to no by-products which can result in solid precipitates in the refining section of a polymer polyol production unit. Such solid by-products are commonly formed by azo initiators such as, for example, AIBN, which forms TMSN (i.e. tetramethyl succinonitrile). Other drawbacks of azo initiators include the toxicity of TMSN and the difficulty of stripping TMSN from the final product (i.e. polymer polyol). When foams are made from polymer polyols which contain an azo initiator, residues of these can escape and may form an undesirable film on nearby surfaces such as, for example, the inside of an automobile windshield. Another problem is that a majority of the peroxide initiators (including most acyl peroxides) raise the viscosity of the resultant polymer polyols. However, this disadvantage is offset by the elimination of TMSN from the resultant polymer polyols. The quantity of free-radical initiator used herein is not critical and can be varied within wide limits. In general, the amount of initiator ranges from about 0.01 to 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

In addition, the polymer polyol and the process of preparing the polymer polyol may optionally comprise a chain transfer agent, i.e. component (5). The use of chain transfer agents and their nature is known in the art. Chain transfer agents are also commonly referred to as polymer control agents (PCA's), molecular weight regulators and/or reaction moderators. Typically, chain transfer agents serve to control the molecular weight of the polymer polyol.

Suitable chain transfer agents and processes for their preparation are known and described in, for example, U.S. Pat. Nos. 3,953,393, 4,119,586, 4,463,107, 5,324,774, 5,814,699 and 6,624,209, the disclosures of which are hereby incorporated by reference. Any of the known chain transfer agents may be suitable herein, provided it does not adversely affect the performance of the polymer polyol. Some examples of suitable materials to be used as chain transfer agents include compounds methanol, ethanol, n-propanol, isopropanol, n-butanol, sec-butanol, tert-butanol, n-pentanol, 2-pentanol, 3-pentanol, allyl alcohols, toluene, ethylbenzene, mercaptans including, e.g. dodecylmercaptan, octadecylmercaptan, ethane thiol, toluene thiol, etc., halogenated hydrocarbons such as, e.g. methylene chloride, carbon tetrachloride, carbon tetrabromide, chloroform, etc., amines such as diethylamine, triethylamine, enol-ethers, etc. If used in the present invention, a chain transfer agent is typically present in an amount of from about 0.1 to about 10% by weight, more preferably from about 0.2 to about 8% by weight, based on the total weight of the polymer polyol (prior to stripping).

Preferred chain transfer agents are ethanol, isopropanol, tert-butanol, toluene and ethylbenzene.

The polymer polyols are preferably produced by utilizing a low monomer to polyol ratio which is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semibatch operation, also by slowly adding the monomers to the polyol.

The temperature range is not critical and may vary from about 100° C. to about 140° C. or perhaps greater, the preferred range being from 115° C. to 125° C. As has been noted herein, the catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.—a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor.

The polymer polyols of the present invention comprise dispersions in which the polymer particles (the same being either individual particles or agglomerates of individual particles) are relatively small in size and, in the preferred embodiment, have a weight average size less than about ten microns. However, when high contents of styrene are used, the particles will tend to be larger; but the resulting polymer polyols are highly useful, particularly where the end use application requires as little scorch as possible.

Following polymerization, volatile constituents, in particular any residues of monomers are generally stripped from the product by the usual method of vacuum distillation, optionally in a thin layer of a falling film evaporator. The monomer-free product may be used as is, of may be filtered to remove any large particles that may have been created. In the preferred embodiment, all of the product (viz. 100%) will pass through the filter employed in the 150 mesh filtration hindrance (filterability) test that will be described in conjunction with the Examples. This ensures that the polymer polyol products can be successfully processed in all types of the relatively sophisticated machine systems now in use for large volume production of polyurethane products, including those employing impingement-type mixing which necessitate the use of filters that cannot tolerate any significant amount of relatively large particles.

In accordance with the present invention, the following materials and processes are suitable for preparation of polyurethane foams from the polymer polyols described above.

Suitable polyisocyanates are known to those skilled in the art and include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Examples of such isocyanates include those represented by the formula, $$Q(NCO)_n$$

in which n is a number from 2-5, preferably 2-3, and Q is an aliphatic hydrocarbon group containing 2-18, preferably 6-10, carbon atoms; a cycloaliphatic hydrocarbon group containing 4-15, preferably 5-10, carbon atoms; an araliphatic hydrocarbon group containing 8-15, preferably 8-13, carbon atoms; or an aromatic hydrocarbon group containing 6-15, preferably 6-13, carbon atoms.

Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (isophorone diisocyanate; e.g. German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4''-triisocyanate; polyphenyl-polymethylene-polyisocyanates of the type which may be obtained by condensing aniline with formaldehyde, followed by phosgenation (crude MDI), which are described, for example, in GB 878,430 and GB 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in GB 994,890, BE 761,616, and NL 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in GB 889,050; polyisocyanates obtained by telomerization reactions of the type described, for example, in U.S. Pat. No. 3,654,106; polyisocyanates containing ester groups of the type described, for example, in GB 965,474 and GB 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. Those skilled in the art will recognize that it is also possible to use mixtures of the polyisocyanates described above.

In general, it is preferred to use readily available polyisocyanates, such as 2,4- and 2,6-toluene diisocyanates and mixtures of these isomers (TDI); polyphenyl-polymethylene-polyisocyanates of the type obtained by condensing aniline with formaldehyde, followed by phosgenation (crude MDI); and polyisocyanates containing carbodiimide groups, urethane groups, allophanate groups, isocyanurate groups, urea groups, or biuret groups (modified polyisocyanates).

Isocyanate-terminated prepolymers may also be employed in the preparation of the flexible foams of the present invention. Prepolymers may be prepared by reacting an excess of organic polyisocyanate or mixtures thereof with a minor amount of an active hydrogen-containing compound as determined by the well-known Zerewitinoff test, as described by Kohler in "Journal of the American Chemical Society," 49, 3181(1927). These compounds and their methods of preparation are well known to those skilled in the art. The use of any one specific active hydrogen compound is not critical; any such compound can be employed in the practice of the present invention.

In accordance with the present invention, the isocyanate-reactive component for the polyurethane foams herein comprise a polymer polyol as described above. It is readily apparent that a conventional polyol component such as, for example, polyethers, polyesters, polyacetals, polycarbonates, polyesterethers, polyester carbonates, polythioethers, polyamides, polyesteramides, amine-terminated polyethers, polysiloxanes, polybutadienes and polyacetones, polybutadienes, polycaprolactones, as well as conventional polymer polyols, PHD modified polyols and/or PIPA modified polyols which are not based on natural oil polyols; and low molecular weight crosslinkers, chain extenders, and reactive modifiers, etc., and mixtures thereof, etc. may also be present as a portion of the isocyanate-reactive component. It is also readily apparent that natural oil polyols such as those base polyols used or described as being suitable for producing the polymer polyols of the current invention may also be added to the isocyanate reactive component to further increase the renewable content of the foams. Renewable polyols added in this manner do not eliminate the amount of renewable polyol required in the base polyol used in preparation of the polymer polyol component. In accordance with the present invention, the isocyanate-reactive component herein preferably comprises from 5 to 100% by weight of a polymer polyol of the present invention (i.e. a polymer polyol in which the base polyol comprises a natural oil polyol as described hereinabove) and from 0 to 95% by weight of a conventional polyol component, with the sum totaling 100% by weight of the isocyanate-reactive component.

Suitable blowing agents for component (III) of the polyurethane foams herein include but are not limited to compounds such as, for example, water, carbon dioxide, methylene chloride, acetone, fluorocarbons, chlorofluorocarbons, hydrochlorofluorocarbons, perfluorocarbons, and low boiling hydrocarbons. Some examples of suitable hydrochlorofluoro-carbons include compounds such as 1,1-dichloro-1-fluoroethane (HCFC-141b), 1-chloro-1,1-difluoroethane (HCFC-142b), and chlorodifluoro-methane (HCFC-22); of suitable hydrofluoro-carbons include compounds such as 1,1,1,3,3-pentafluoropropane (HFC-245fa), 1,1,1,2-tetrafluoroethane (HFC-134a), 1,1,1,3,3,3-hexafluoro-propane (HFC-236fa), 1,1,2,3,3,3-hexafluoropropane (HFC-236ea), and 1,1,1,4,4,4-hexafluorobutane (HFC-356mffm); of suitable perfluorinated hydrocarbons include compounds such as perfluoropentane or perfluoro-hexane; and of suitable hydrocarbons include compounds such as various isomers of butane, pentane, cyclopentane, hexane, or mixtures of thereof. Water and carbon dioxide are more preferred blowing agents, with water being most preferred.

In accordance with the present invention, the quantity of blowing agent used is typically that which will produce foams having a density as described herein. As one of ordinary skill in the art would know and understand, it is necessary to use a larger quantity of blowing agent to form a lower density foam while a higher density foam requires a smaller quantity of blowing agent. The quantity of blowing used should typically produce foams which have a density of about 0.5 pcf or more, preferably about 1.0 pcf or more, more preferably about 1.2 pcf or more, and most preferably about 1.5 pcf or more. The quantity of blowing agent used should also typically produce foams which have a density of less than or equal to 20 pcf, preferably less than or equal to 10 pcf, and more preferably less or equal to 8 pcf and most preferably less than or equal to 5 pcf. The quantity of blowing agent used in the present invention should produce a foam having a density ranging between any combination of these upper and lower values, inclusive, e.g. from at least about 0.5 to about 20 pcf, preferably from about 1.0 to about 10 pcf, more preferably from about 1.2 to about 8 pcf, and most preferably from about 1.5 to about 5 pcf.

Catalysts suitable for the polyurethane foam of the present invention include, for example, amine compounds and organometallic compounds. Suitable examples of such catalysts include tertiary amines, such as triethylamine, tributylamine, N-methylmorpholine, N-ethyl-morpholine, N,N,N',N'-tetramethylethylenediamine, pentamethyl-diethylenetriamine and higher homologues (as described in, for example, DE-A 2,624,527 and 2,624,528), 1,4-diazabicyclo(2.2.2)octane, N-methyl-N'-dimethyl-aminoethylpiperazine, bis-(dimethylaminoalkyl)piperazines, N,N-dimethylbenzylamine, N,N-dimethylcyclohexylamine, N,N-diethyl-benzylamine, bis-(N,N-diethylaminoethyl) adipate, N,N,N',N'-tetramethyl-1,3-butanediamine, N,N-dimethyl-β-phenylethylamine, 1,2-dimethyl-imidazole, 2-methylimidazole, monocyclic and bicyclic amines together with bis-(dialkylamino)alkyl ethers, such as 2,2-bis-(dimethylaminoethyl)ether.

Other suitable catalysts which may be used in producing the inventive polyurethane foams include, for example, organometallic compounds, and particularly, organotin compounds. Organotin compounds which may be considered suitable include those organotin compounds containing sulfur. Such catalysts include, for example, di-n-octyltin mercaptide. Other types of suitable organotin catalysts include, preferably tin(II) salts of carboxylic acids such as, for example, tin(II) acetate, tin(II) octoate, tin(II) ethylhexoate and/or tin(II) laurate, and tin(IV) compounds such as, for example, dibutyltin oxide, dibutyltin dichloride, dibutyltin diacetate, dibutyltin dilaurate, dibutyltin maleate and/or dioctyltin diacetate.

Suitable additives which may optionally be included in the polyurethane forming formulations of the present invention include, for example, foam stabilizers, other catalysts, cell regulators, reaction inhibitors, flame retardants, plasticizers, pigments, fillers, etc.

Foam stabilizers which may be considered preferable for use in the inventive process include, for example, polysiloxanes, polyether siloxanes, and preferably those which are insoluble or have low solubility in water. Compounds such as these are generally of such a structure that copolymers of ethylene oxide and propylene oxide are attached to a polydimethylsiloxane residue. Such foam stabilizers are described in, for example, U.S. Pat. Nos. 2,834,748, 2,917, 480 and 3,629,308, the disclosures of which are hereby incorporated by reference. Other of surface active agents including non-silicone types may also be employed.

Further examples of suitable additives, which may optionally be included in the flexible polyurethane foams of the present invention can be found in Kunststoff-Handbuch, volume VII, edited by Vieweg & Hochtlen, Carl Hanser Verlag, Munich 1993, 3rd Ed., pp. 104 to 127, for example.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following compounds and materials were used in the working examples of the present invention:

Polyol A: A propylene oxide adduct of sorbitol, containing 8% ethylene oxide with a hydroxyl number of 28.

Base Polyol A: A propylene oxide/ethylene oxide adduct of castor oil (Base Polyol E) with a hydroxyl number of about 52 and a viscosity of 796 centistokes (cSt) at 25° C. prepared by using a double metal cyanide complex catalyst. Renewable oil content ~29%.

Base Polyol B: A propylene oxide/ethylene oxide adduct of castor oil (Base Polyol E) with a hydroxyl number of about 55 and a viscosity of 703 centistokes (cSt) at 25° C. prepared by using a double metal cyanide complex catalyst. Renewable oil content ~=31%.

Base Polyol C: A propylene oxide/ethylene oxide adduct of castor oil (Base Polyol E) with a hydroxyl number of about 107 and a viscosity of 579 centistokes (cSt) at 25° C. prepared by using a double metal cyanide complex catalyst. Renewable oil content ~=59%.

Base Polyol D: A propylene oxide/ethylene oxide adduct of castor oil (Base Polyol E) with a hydroxyl number of about 133 and a viscosity of 607 centistokes (cSt) at 25° C. prepared by using a double metal cyanide complex catalyst. Renewable oil content ~=74%

Base Polyol E: Castor oil with the trade name DB® CASTOR OIL which is commercially available from Caschem Renewable oil content ~=100%.

Base Polyol F: Hydroxylated soybean oil with the trade name Vikol 1® which is commercially available from Arkema with a hydroxyl number of 153. Renewable oil content~=100%.

Base Polyol G: Soybean oil (non-hydroxylated) with trade name AR® Soybean Oil which is commercially available from Cargill. Renewable oil content ~=100%.

Base Polyol H: Hydroxylated soybean oil with trade name Agrol® 3.0 which is commercially available from BioBased Technologies with a hydroxyl number of 104. Renewable oil content ~=100%.

Base Polyol I: A propylene oxide/ethylene oxide adduct of castor oil (Base Polyol E), R-3324, with a hydroxyl number of 56 and a viscosity of 690 centistokes (cSt) at 25° C. prepared by using a double metal cyanide complex catalyst. Renewable oil content ~=31%.

Base Polyol J: A propylene oxide/ethylene oxide adduct of castor oil (Base Polyol E) with a hydroxyl number of 32, a primary OH content of 74% by weight, and a viscosity of 1755 cSt at 25° C., prepared by using a double metal cyanide complex catalyst. Renewable oil content~=18%

CTA: Isopropanol, a chain transfer agent

SAN: Styrene:acrylonitrile

TMI: Isopropenyl dimethyl benzyl isocyanate (an unsaturated aliphatic isocyanate) which is commercially available as TMI® from Cytec Industries TBPO: tert-Butyl peroxide, a free-radical polymerization initiator commercially available from Pergan Marshall LLC.

AIBN: 2,2'-Azobisisobutyronitrile, a free-radical polymerization initiator commercially available as VAZO 64 from E.I. Du Pont de Nemours and Co.

TAPP: Tert-Amyl Peroxy pivalate, a free-radical polymerization initiator commercially available from Degussa Initiators Renewable Oil Content: In Base Polyols A through J, this is defined as:

$$\frac{\text{wt. of renewable oil starter}}{\text{wt. of base polyol}} \times 100\%$$

As used in the definition above, examples of renewable oil starters include (but are not limited to) castor oil, hydroxylated soybean oil, etc.

Viscosity: Viscosities were measured by Cannon-Fenske viscometer (cSt at 25° C.)

Filtration Hindrance (i.e. filterability): Filterability was determined by diluting one part by weight sample (e.g. 200 grams) of polymer polyol with two parts by weight anhydrous isopropanol (e.g. 400 grams) to remove any viscosity-imposed limitations and using a fixed quantity of material relative to a fixed cross-sectional area of screen (e.g. 1⅛ in. diameter), such that all of the polymer polyol and isopropanol solutions passes by gravity through a 150-mesh screen. The 150-mesh screen has a square mesh with average mesh opening of 105 microns and it is a "Standard Tyler" 150 square-mesh screen.

General Procedure for Macromer Preparation:

Macromer A: Prepared by heating Polyol A (100 parts), TMI (2 parts), and 100 ppm stannous octoate catalyst at 75° C. for 2 hours.

General Procedure for Preformed Stabilizer (PFS) Preparation:

The pre-formed stabilizer (PFS A) was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120° C. The product from the second-stage reactor overflowed continuously through a pressure regulator designed to control the pressure in each stage at 65 psig. The product, i.e. the pre-formed stabilizer, then passed through a cooler and into a collection vessel. The preformed stabilizer formulation is disclosed in Table 1.

Preformed Stabilizer Composition:

|  | PFS A |
| --- | --- |
| CTA type | isopropanol |
| CTA concentration in feed, wt-% | 30-80% |
| Macromer | Macromer A |
| Macromer concentration in feed, wt-% | 10-40% |
| Monomers concentration in feed, wt-% | 10-30% |
| TBPO concentration, wt-% | 0.1-2% |

Polymer Polyol Preparation: (Used in Examples 1-13)

This series of examples relates to the preparation of polymer polyols. The polymer polyols were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115°D or 120° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt-% total polymer in the product was calculated from the concentrations of monomers measured in the crude polymer polyol before stripping. The preformed stabilizer (PFS A) described above was used to produce the examples in Table 1.

TABLE 1A

Polymer Polyols 1-7 - Formulation and Properties

| | Example | | | | | | |
|---|---|---|---|---|---|---|---|
| | 1 | 2 | 3 | 4 | 5 | 6 | 7 |
| PMPO Product | | | | | | | |
| Base Polyol (% by wt.) | A (55%) | B (55%) | C (55%) | D (55%) | E (60%) | E (55%) | F (55%) |
| % by wt. solids | 45% | 45% | 45% | 45% | 40% | 45% | 45% |
| S:AN wt. ratio | 65.2:34.8 | 65.2:34.8 | 65.2:34.8 | 65.2:34.8 | 65.2:34.8 | 65.2:34.8 | 65.2:34.8 |
| PMPO Process | | | | | | | |
| PFS A[1] | 8.33% | 8.33% | 8.33% | 8.33% | 12.5% | 12.5% | 8.33% |
| Total CTA[1] | 5.0% | 5.0% | 5% | 5% | 7.5% | 7.5% | 5% |
| AIBN Initiator[1] | 0.32% | 0.32% | 0.32% | | | | |
| TAPP Initiator[1] | | | | 0.35% | 0.53% | 0.53% | 0.35% |
| PMPO Product Properties | | | | | | | |
| Viscosity (cSt, 25° C.) | 5659 | 4643 | 4364 | 4896 | 4465 | 6148 | 9197 |
| OH number[2] | 29.2 | 53.8 | 59.0[3] | 79 | 101 | 104 | 84.1[3] |
| 150-mesh filtration | 100% | 100% | 100% | 100% | 100% | 100% | 100% |

[1] %'s by weight
[2] OH number for the polymer polyol
[3] calculated OH number

TABLE 1B

Polymer Polyols 8-13 - Formulation and Properties

| | Example | | | | | |
|---|---|---|---|---|---|---|
| | 8 | 9 | 10[4] | 11 | 12 | 13 |
| PMPO Product | | | | | | |
| Base Polyol (% by wt.) | 50% E/ 50% A (55%) | 75% E/ 25% A (55%) | G (60%) | H (55%) | I (55%) | J (55%) |
| % by wt. solids | 45% | 45% | 40% | 45% | 45% | 45% |
| S:AN wt. ratio | 65.2:34.8 | 65.2:34.8 | 65.2:34.8 | 65.2:34.8 | 65.2:34.8 | 65.2:34.8 |
| PMPO Process | | | | | | |
| PFS A[1] | 8.33% | 8.33% | 12.5% | 8.33% | 8.33% | 8.33% |
| Total CTA[1] | 5% | 5% | 7.5% | 5% | 5% | 5% |
| AIBN Initiator[1] | 0.32% | 0.32% | | | 0.32% | 0.32% |
| TAPP Initiator[1] | | | 0.53% | 0.35% | | |
| PMPO Product Properties | | | | | | |
| Viscosity (cSt, 25° C.) | 5563 | 5287 | 77380 | 2566 | 3870 | 19432 |
| OH number[2] | 65.5[3] | 84.0[3] | NA | 54.2 | 39 | 19.3 |

TABLE 1B-continued

Polymer Polyols 8-13 - Formulation and Properties

| | Example | | | | | |
|---|---|---|---|---|---|---|
| | 8 | 9 | 10[4] | 11 | 12 | 13 |
| 150-mesh filtration | 100% | 100% | 100% | 100% | 100% | 100% |

[1]%'s by weight
[2]OH number for the polymer polyol
[3]calculated OH number
[4]comparative example of non-hydroxylated soybean oil used instead of NOP derived polyol.

In the preparation of polyurethane foams, the following materials were also used:

PMPO A: a commercially available polymer polyol blend having a OH number of 30 and a total SAN solids content of 10% by weight. The base polyol of this PMPO is a propylene and ethylene oxide adduct of glycerin and sorbitol and has an OH number of about 33.5, an average nominal functionality of about 4.0 and a primary hydroxyl content of 80 to 90% and does not contain a renewable oil derived polyol.

PMPO B: a commercially available polymer polyol blend having an OH number of about 28 and a total SAN solids content of 44% by weight. The base polyol of this PMPO is a propylene and ethylene oxide adduct of glycerin and has an OH number of about 53, an average nominal functionality of about 3.0 and a primary hydroxyl content of <10% and does not contain a renewable oil derived polyol.

PMPO C: a commercially available polymer polyol having an OH number of 20 and a total SAN solids content of 43% by weight. The base polyol of this PMPO is a propylene and ethylene oxide adduct of glycerin and has an OH number of about 35, an average nominal functionality of about 3.0 and a primary hydroxyl content of 83 to 90% and does not contain a renewable oil derived polyol.

Polyol B: a commercially available polyether polyol having an OH number of 650 and a functionality 3, which is a propylene oxide adduct of glycerin. It does not contain a renewable oil derived polyol.

Polyol C: a commercially available polyether polyol having an OH number of about 35, a nominal functionality of about 3.8 and a primary OH content of from 83 to 90% by weight, which is a propylene oxide/ethylene oxide adduct of glycerin and sorbitol. It does not contain a renewable oil derived polyol.

TDI: toluene diisocyanate containing about 80% by weight of the 2,4-isomer and about 20% by weight of the 2,6-isomer PMDI: a polymethylene poly(phenylisocyanate) having an NCO group content of about 32% by weight and a functionality of about 2.4

DEOA: diethanolamine, a commercially available foam crosslinker/foam modifier from Air Products DP-1022: 2-methyl-1,3-propanediol, a foam modifier (extender) having an OH number of about 1240, commercially available as NIAX Processing Additive DP-1022 from Momentive Performance Materials NIAX U-2000: a silicone surfactant, commercially available from Momentive Performance Materials as NIAX U-2000

NIAX L 620: a silicone surfactant, commercially available from Momentive Performance Materials as NIAX L 620

NIAX L 635: a silicone surfactant, commercially available from Momentive Performance Materials as NIAX L 635

DC 5043: a silicone surfactant, commercially available from Air Products as DC 5043

NIAX L-626: a silicone surfactant, commercially available from Momentive Performance Materials as NIAX L-626

NIAX A-1: an amine catalyst, commercially available from Momentive Performance Materials as NIAX A-1

NIAX C-183: an amine catalyst blend, commercially available from Momentive Performance Materials as NIAX C-183

NIAX A-33: an amine catalyst, commercially available from Momentive Performance Materials as NIAX A-33

DABCO T-9: a tin catalyst (stannous octoate), commercially available from Air Products as DABCO T-9

T-12D: a 25% by weight solution of DABCO T-12 catalyst (dibutyltin dilaurate) available from Air Products in diisonylphthalate (available from Ashland Chemical)

Ortegol 501: a cell opening additive, commercially available from Evonik Goldschmidt Corp. as Ortegol 501

FIREMASTER 550: a flame retardant, commercially available from Chemtura as FIREMASTER 550

EXAMPLES

The free-rise flexible and semi-rigid foams in Examples 14-19 and 28-42 were prepared by the following procedure:

All the formulation ingredients except Dabco T-9 catalyst (if used) and the isocyanate component were added to a one-half gallon cylindrical container fitted with baffles. The contents were mixed at 2400 rpm for 60 seconds with an agitator having two turbine impellers. The mixture was then degassed for 15 seconds. Dabco T-9 catalyst, if used, was added at this time. After degassing, the contents were mixed at 2400 rpm for 15 seconds, during which period the isocyanate component was added with about 7 seconds of mixing remaining. The mixture was then poured into a 14×14×6-inch cardboard box, where it rose freely until the reaction was complete. A batch size sufficient to give a bun height of ~9 inches high was employed. The freshly prepared bun was cured for 5 minutes in an oven at 120° C. and then allowed to cure at ambient conditions for a minimum of 2 days. Observations made during foaming and cure are provided in Tables 2B, 4B and 5B. The cured buns were then trimmed to 12×12×4 inches using a band saw. These samples were then conditioned for at least 16 hours at standard temperature (~23° C.) and humidity (~50%) before testing for physical and mechanical properties.

EXAMPLES

The molded foams in Examples 20 to 29 were prepared by the following procedure:

All the formulation ingredients except the isocyanate component were added to a one-half gallon cylindrical container fitted with baffles. The contents were mixed at 3700 rpm for 60 seconds with an agitator having two turbine impellers. The mixture was then degassed for 60 seconds. The isocyanate was added to the container and the contents were mixed for 5 seconds. The mixture was then poured into a preconditioned mold (15×15×2"), preheated to 65° C., while shaking the mixing container to ensure that the required amount was transferred to the mold. The mold was immediately clamped and sealed. The foam reaction proceeded for the prescribed demold time of 4 to 5 minutes, after which the foam was demolded. The foam was aged for seven days at room temperature prior to measuring physical and mechanical properties.

The physical or mechanical properties of the molded and free-rise foams were measured per the procedures prescribed in ASTM D3574-05 unless noted otherwise below. Wet Compression Set (50%) was determined by measuring the height of three 2×2×1" specimens per sample, compressing to 50% of their height, holding for 22 hours in the compressed state at 50° C. and 95% relative humidity, removing the specimens from the compression fixture and allowing the specimens to recover for 30 minutes at room temperature, remeasuring the height and then determining the average percent height loss relative to the original height. Air flow was measured on 2"×2"×1" thick specimens using an AMSCOR Model 1377 Foam Porosity Instrument.

TABLE 2A

Free-Rise Flexible Foam Formulations for Examples 14-19

| | Example | | | | | |
|---|---|---|---|---|---|---|
| | 14* | 15 | 16* | 17 | 18 | 19 |
| PMPO A | 70 | 70 | | | 70 | 70 |
| PMPO B | 30 | | 100 | | | |
| PMPO Ex. 2 | | 30 | | | | |
| PMPO Ex. 1 | | | | 100 | | |
| PMPO Ex. 11 | | | | | 30 | |
| PMPO Ex. 12 | | | | | | 30 |
| Water | 2.4 | 2.4 | 2.3 | 2.3 | 2.4 | 2.4 |
| Firemaster 550 | 2 | 2 | | | 2 | 2 |
| DEOA | 1.2 | 1.2 | | | 1.2 | 1.2 |
| Niax U-2000 | 1.2 | 1.2 | | | 1.2 | 1.2 |
| Niax L-620 | | | 0.45 | | | |
| Niax L-635 | | | | 0.64 | | |
| Niax A-1 | | | 0.03 | 0.03 | | |
| Niax C-183 | 0.2 | 0.2 | | | 0.2 | 0.2 |
| Dabco T-9 | | | 0.1 | 0.175 | | |
| T-12D | 0.16 | 0.16 | | | 0.18 | 0.1 |
| TDI | 32.86 | 32.95 | 30.57 | 30.78 | 34.16 | 33.11 |
| Index (100A/B) | 107 | 107 | 115 | 115 | 107 | 107 |
| NOP Content[1] of Base Polyol | 0 | ~21 | 0 | ~100 | ~21 | ~21 |
| Renew. Oil Content[2] of Base Polyol | 0 | ~6 | 0 | ~29 | ~16 | ~6 |

*Comparative examples.
[1]NOP Content (%) = 100 × wt. of renewable derived polyol/total wt. of base polyol
[2]Renew. Oil Content (%) = NOP Content × renew. oil in content of NOP (%)/100

TABLE 2B

Processing and Properties of Flexible Foam Examples 14-19

| | Example | | | | | |
|---|---|---|---|---|---|---|
| | 14* | 15 | 16* | 17 | 18 | 19 |
| Processing Details: | | | | | | |
| Cream Time (sec) | 8 | 8 | 10 | 10 | 9 | 9 |
| Other | good blowing | good blowing | good blowing | good blowing | good processing | good processing |
| Test Details: | | | | | | |
| Density (lb/ft$^3$) | 2.33 | 2.38 | 2.42 | 2.46 | 2.39 | 2.32 |
| Resilience (%) | 55 | 53 | 28 | 22 | 47 | 53 |
| Air Flow (ft$^3$/min) | 1.63 | 1.32 | 2.08 | 1.2 | 1.65 | 1.32 |
| IFD Height (in) | 3.99 | 3.99 | 4.07 | 4.1 | 3.99 | 4.00 |
| IFD 25% (lb/50 in$^2$) | 38.46 | 41.12 | 132.61 | 146.98 | 31.25 | 34.13 |
| IFD 65% (lb/50 in$^2$) | 86.55 | 92.43 | 271.06 | 332.19 | 71.69 | 76.46 |
| IFD 25% Return (lb/50 in$^2$) | 30.73 | 32.87 | 82.99 | 82.50 | 22.99 | 26.37 |
| Return Val. @ 25° C. (%) | 79.90 | 79.93 | 62.58 | 56.13 | 73.54 | 77.26 |
| S.F. 65%/25% | 2.25 | 2.25 | 2.04 | 2.26 | 2.29 | 2.24 |
| Tensile strength (psi) | 22.54 | 24.06 | 27.46 | 25.62 | 21.38 | 20.19 |
| Elongation (%) | 119.20 | 125.80 | 74.46 | 55.50 | 133.9 | 127.2 |
| Tear Strength (pli) | 1.45 | 1.52 | 2.62 | 1.79 | 1.56 | 1.47 |
| Comp. Set 90% (Cd) (%) | 5.65 | 6.65 | 6.87 | 13.30 | 7.94 | 5.56 |
| HACS 75% (Cd) (%) | 7.91 | 8.63 | 7.38 | 17.10 | 16.18 | 12.87 |
| Wet Set 50% (Ct) (%) | 11.24 | 17.38 | 5.52 | 17.33 | 17.55 | 14.53 |

Examples 14 and 16 were control examples which used 100% conventional polymer polyols.
Example 15, 17, 18 and 19 are representative of the invention.

TABLE 3A

Molded Flexible Foam Formulations for Examples 20-27

| | Example | | | | | | | |
|---|---|---|---|---|---|---|---|---|
| | 20* | 21 | 22 | 23 | 24 | 25 | 26 | 27 |
| PMPO C | 53.5 | 27.5 | 27.5 | 27.5 | 27.5 | 53.5 | 27.5 | 27.5 |
| Polyol C | 46.5 | 46.5 | 46.5 | 46.5 | 46.5 | 46.5 | 46.5 | 46.5 |
| PMPO Ex. 13 | | 26 | | | | | | |
| PMPO Ex. 3 | | | 26 | | | | | |
| PMPO Ex. 4 | | | | 26 | | | | |
| PMPO Ex. 7 | | | | | 26 | | | |
| PMPO Ex. 6 | | | | | | | 26 | |
| PMPO Ex. 5 | | | | | | | | 26 |
| Water | 4.26 | 4.26 | 4.26 | 4.26 | 4.26 | 4.26 | 4.26 | 4.26 |
| DEOA | 1.2 | 1.2 | 1.2 | 1.2 | 1.2 | 1.2 | 1.2 | 1.2 |
| DC 5043 | 1 | 1 | 1 | 1 | 1 | 1 | 1 | 1 |
| Niax A-33 | 0.32 | 0.32 | 0.32 | 0.32 | 0.32 | 0.32 | 0.32 | 0.32 |
| Niax A-1 | 0.08 | 0.08 | 0.08 | 0.08 | 0.08 | 0.08 | 0.08 | 0.08 |
| TDI | 50.82 | 50.79 | 52.47 | 53.06 | 53.52 | 50.82 | 54.16 | 54.54 |
| Index (100A/B) | 105 | 105 | 105 | 105 | 105 | 105 | 105 | 105 |
| NOP Content[1] of Base Polyol | 0 | ~19 | ~19 | ~19 | ~19 | 0 | ~19 | ~20 |
| Renew. Oil Content[2] of Base Polyol | 0 | ~3 | ~8 | ~14 | ~19 | 0 | ~19 | ~20 |

*Comparative example
[1]NOP Content (%) = 100 × wt. of renewable derived polyol/total wt. of base polyol
[2]Renew. Oil Content (%) = NOP Content × renew. oil in content of NOP (%)/100

TABLE 3B

Processing and Properties of Molded Flexible Foam Examples 20-27

| | Example | | | | | | | |
|---|---|---|---|---|---|---|---|---|
| | 20* | 21 | 22 | 23 | 24 | 25 | 26 | 27 |
| Processing Details: | | | | | | | | |
| Characteristics | Good | Good | Good | Good | Good | Good | Sub-surface voids | Sub-surface voids |
| Cell Structure | Fine (A) | Fine (A) | Fine (A) | Fine (A) | Fine (A) | Fine (A) | Fine (A) | Fine (A) |
| Test Details: | | | | | | | | |
| Density (lb/ft$^3$) | 2.13 | 2.23 | 2.08 | 2.10 | 2.17 | 2.18 | 2.23 | 2.52 |
| Resilience (%) | 59.00 | 57.00 | 48 | 47 | 45.5 | 60.5 | 42.5 | 42 |
| Air Flow (ft$^3$/min) | 2.52 | 1.39 | 2.06 | 2.35 | 1.61 | 2.23 | 1.16 | 1.05 |
| IFD Height (in) | 3.81 | 3.87 | 3.89 | 3.90 | 3.85 | 3.84 | 4.09 | 3.91 |
| IFD 25% (lb/50 in$^2$) | 50 | 52 | 55 | 55 | 64 | 49 | 64 | 64 |
| IFD 50% (lb/50 in$^2$) | 91 | 88 | 106 | 107 | 121 | 90 | 124 | 122 |
| IFD 65% (lb/50 in$^2$) | 142 | 131 | 163 | 166 | 184 | 141 | 192 | 188 |
| Return Val.@ 25° C. (%) | 70 | 71 | 61 | 58 | 54 | 71 | 54 | 53 |
| S.F. 50%/25% | 1.82 | 1.72 | 1.93 | 1.94 | 1.90 | 1.84 | 1.95 | 19.2 |
| S.F. 65%/25% | 2.83 | 2.54 | 2.96 | 3.01 | 2.89 | 2.88 | 3.02 | 2.96 |
| Tensile strength (psi) | 25.19 | 15.25 | 26.46 | 23.78 | 29.15 | 22.29 | 27.00 | 28.12 |
| Elongation (%) | 89.20 | 61.86 | 79.62 | 69.17 | 76.08 | 83.27 | 71.05 | 73.64 |
| Tear Strength (pli) | 1.55 | 1.77 | 1.62 | 1.57 | 1.49 | 1.59 | 1.76 | 1.76 |
| Comp.Set 90% (Cd) (%) | 13.14 | 30.24 | 18.56 | 11.95 | 15.95 | 16.30 | 27.46 | 32.24 |
| HA Ld Loss 50% (%) | 1.35 | 0.10 | -2.57 | -2.90 | -1.60 | 1.14 | 5.67 | 6.59 |
| HACS 5)% (Cd) (%) | 20.36 | 51.82 | 37.10 | 21.03 | 26.29 | 26.11 | 49.16 | 50.66 |

TABLE 3B-continued

Processing and Properties of Molded Flexible Foam Examples 20-27

| | Example | | | | | | | |
|---|---|---|---|---|---|---|---|---|
| | 20* | 21 | 22 | 23 | 24 | 25 | 26 | 27 |
| Wet Set 50% (Ct) (%) | 37.83 | 43.63 | 39.04 | 35.95 | 39.72 | 41.23 | 44.64 | 45.31 |

*Comparative example

TABLE 4A

Semi-Rigid Foam Formulations for Examples 28-34

| | Example | | | | | | |
|---|---|---|---|---|---|---|---|
| | 28* | 29 | 30 | 31 | 32 | 33 | 34* |
| PMPO B | 83 | | | | | | 83 |
| PMPO Ex. 5 | | | | | | | |
| PMPO Ex. 6 | | | | | | | |
| PMPO Ex. 7 | | | | | 88.5 | | |
| PMPO Ex. 4 | | | | 87 | | | |
| PMPO Ex. 3 | | 85 | 85 | | | | |
| PMPO Ex. 2 | | | | | | 81 | |
| Polyol B | 15 | 15 | 15 | 13 | 11.5 | 19 | 15 |
| Water | 3 | 3 | 3 | 3 | 3 | 3 | 3 |
| DP-1022 | 2 | | | | | | 2 |
| Niax L-620 | 1.125 | 1.125 | 1.125 | 1.125 | 1.125 | 1.125 | 1.125 |
| Niax L-635 | | | | | | | |
| Niax L-626 | 0.375 | 0.375 | 0.375 | 0.375 | 0.375 | 0.375 | 0.375 |
| Ortegol 501 | 1.5 | 1.5 | 1.5 | 1.5 | 1.5 | 1.5 | 1.5 |
| Dabco T-9 | 0.25 | 0.25 | 0.25 | 0.25 | 0.25 | 0.25 | 0.25 |
| Niax A-1 | 0.15 | 0.15 | 0.15 | 0.15 | 0.15 | 0.15 | 0.15 |
| PMDI | 89.93 | 90.04 | 90.04 | 90.11 | 90.38 | 90.13 | 89.93 |
| Index (100A/B) | 115.5 | 115 | 115 | 115 | 115 | 115 | 115.5 |
| NOP Content[1] of Base Polyol | 0 | 76 | 76 | 79 | 81 | 70 | 0 |
| Renew. Oil Content[2] of Base Polyol | 0 | 45 | 45 | 58 | 81 | 22 | 0 |

*Comparative examples.
[1]NOP Content (%) = 100 × wt. of renewable derived polyol/total wt. of base polyol
[2]Renew. Oil Content (%) = NOP Content × renew. oil in content of NOP (%)/100

TABLE 4B

Processing and Properties of Semi-Rigid Foam Examples 28-34

| | Example | | | | | | |
|---|---|---|---|---|---|---|---|
| | 28* | 29 | 30 | 31 | 32 | 33 | 34* |
| Processing Details: | | | | | | | |
| Cream Time (sec) | 8 | 8 | 8 | 8 | 8 | 8 | 8 |
| Settle (%) | 0.6 | 1.9 | 0.0 | 1.3 | 3.1 | 2.5 | 1.3 |
| Cell Structure | Very fine (AA) | Fine (A) | Fine (A) | Fine-Medium (AB) | Fine-Medium (AB) | Fine-Medium (AB) | Fine-Medium (AB) |
| Testing Details: | | | | | | | |
| Density (lb/ft³) | 2.60 | 2.59 | 2.52 | 2.34 | 2.26 | 2.66 | 2.48 |
| Air Flow (ft³/min) | 0.03 | 0.05 | 0.04 | 0.04 | 0.04 | 0.03 | 0.03 |
| CFD 50% (psi) | 13.98 | 10.90 | 14.48 | 12.92 | 14.56 | 10.65 | 11.96 |
| Tensile Strength (psi) | 28.10 | 29.40 | 27.40 | 25.10 | 5.70 | 30.40 | 28.00 |
| Elongation (%) | 12.20 | 10.80 | 10.80 | 8.40 | 2.70 | 12.10 | 15.40 |

*Comparative examples

TABLE 5A

Semi-Rigid Foam Formulations for Examples 35-42

| | Example | | | | | | | |
|---|---|---|---|---|---|---|---|---|
| | 35* | 36 | 37 | 38 | 39 | 40 | 41 | 42* |
| PMPO B | 80.7 | | | | | | | 80.7 |
| PMPO Ex. 5 | | | | | 92.5 | | | |
| PMPO Ex. 6 | | | | | | 91 | | |
| PMPO Ex. 7 | | | | | | | 88.6 | |
| PMPO Ex. 4 | | | 87 | | | | | |
| PMPO Ex. 3 | | 85 | | | | | | |
| PMPO Ex. 2 | | | | 81 | | | | |
| Polyol B | 19.3 | 15 | 13 | 19 | 7.5 | 9 | 11.4 | 19.3 |
| Water | 3 | 3 | 3 | 3 | 3 | 3 | 3 | 3 |
| DP-1022 | | | | | | | | |
| Niax L-620 | | | | | | | | |
| Niax L-635 | 1 | 1 | 1 | 1 | 1 | 1 | 1 | 1 |
| Niax L-626 | 0.33 | 0.33 | 0.33 | 0.33 | 0.33 | 0.33 | 0.33 | 0.33 |
| Ortegol 501 | 1.5 | 1.5 | 1.5 | 1.5 | 1.5 | 1.5 | 1.5 | 1.5 |
| Dabco T-9 | 0.25 | 0.25 | 0.25 | 0.25 | 0.3 | 0.3 | 0.3 | 0.25 |
| Niax A-1 | 0.15 | 0.15 | 0.15 | 0.15 | 0.15 | 0.15 | 0.15 | 0.15 |
| PMDI | 90.14 | 89.94 | 90.01 | 90.03 | 90.1 | 90.11 | 90.12 | 90.14 |
| Index (100A/B) | 115 | 115 | 115 | 115 | 115 | 115 | 115 | 115 |
| NOP Content[1] of Base Polyol | 0 | 76 | 79 | 70 | 88 | 85 | 82 | 0 |
| Renew. Oil Content[2] of Base Polyol | 0 | 45 | 58 | 22 | 88 | 85 | 82 | 0 |

*Comparative examples

[1]NOP Content (%) = 100 × wt. of renewable derived polyol/total wt. of base polyol
[2]Renew. Oil Content (%) = NOP Content × renew. oil in content of NOP (%)/100

TABLE 5B

Processing and Properties of Semi-Rigid Foam Examples 35-42

| | Example | | | | | | | |
|---|---|---|---|---|---|---|---|---|
| | 35* | 36 | 37 | 38 | 39 | 40 | 41 | 42* |
| Processing Details: | | | | | | | | |
| Cream Time (sec) | 10 | 11 | 10 | 9 | 9 | 9 | 9 | 9 |
| Settle (%) | 0.1 | 0.0 | 0.0 | 1.2 | 0.0 | 0.0 | 1.1 | 0.5 |
| Cell Structure | Fine (A) | Fine (A) | Fine (A) | Fine (A) | Fine (A) | Fine (A) | Fine (A) | Fine (A) |
| Testing Details: | | | | | | | | |
| Density (lb/ft³) | 2.36 | 2.57 | 2.48 | 2.02 | 2.49 | 2.44 | 2.20 | 2.43 |
| Air Flow (ft³/min) | 0.03 | 0.03 | 0.04 | 0.03 | 0.04 | 0.03 | 0.12 | 0.03 |
| CFD 50% (psi) | 9.89 | 13.35 | 12.81 | 8.61 | 11.28 | 11.18 | 10.49 | 9.70 |
| Tensile Strength (psi) | 11.90 | 14.10 | 17.10 | 18.70 | 22.00 | 22.30 | 1.00 | 12.50 |
| Elongation (%) | 9.70 | 8.60 | 9.70 | 10.50 | 7.80 | 12.20 | 0.70 | 7.70 |

*Comparative examples

In Tables 3B, 4B and 5B, the notations for cell size are further defined as:

| AA | represents very fine cell size |
|---|---|
| A | represents fine cell size |
| AB | represents fine-medium cell size |

Examples 20, 28, 34, 35 and 42 were control examples which used 100% conventional polymer polyols. Examples 21-27, 29-33 and 36-41 are representative of the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane foam comprising the reaction product of:
   (I) at least one polyisocyanate component,
   with
   (II) at least one isocyanate-reactive component which comprises a polymer polyol which comprises the free-radical polymerization reaction product of:
   (1) a base polyol selected from the group consisting of:
      (c) one or more polyols which comprise the alkoxylation product of one or more natural oils which naturally contains at least one hydroxyl group with one or more alkylene oxides, (d) one or more polyols which comprise the alkoxylation product of one or more hydroxylated derivatives of one or more natural oils with one or more alkylene oxides;
and
(e) mixtures thereof;
(2) at least one ethylenically unsaturated monomer, and
(3) a preformed stabilizer,
in the presence of
(4) a free-radical polymerization initiator,
and, optionally,
(5) a chain transfer agent,
wherein said polyol (1)(c) and polyol (1)(d) are alkoxylation products prepared in the presence of a double metal cyanide (DMC) catalyst,
in the presence of
(III) at least one blowing agent,
and
(IV) at least one catalyst;
wherein said foam is a flexible foam having an elongation of at least 50%.

2. The polyurethane foam of claim 1, wherein (II) said isocyanate-reactive component additionally comprises at least one conventional polyol component selected from the group consisting of polyether polyols, polyester polyols and mixtures thereof.

3. A process for the preparation of a polyurethane foam comprising reacting
(I) at least one polyisocyanate component,
with
(II) at least one isocyanate-reactive component which comprises a polymer polyol which comprises the free-radical polymerization reaction product of:
(1) a base polyol selected from the group consisting of:
(c) one or more polyols which comprise the alkoxylation product of one or more natural oils which naturally contains at least one hydroxyl group with one or more alkylene oxides,
(d) one or more polyols which comprise the alkoxylation product of one or more hydroxylated derivatives of one or more natural oils with one or more alkylene oxides;
and
(e) mixtures thereof;
(2) at least one ethylenically unsaturated monomer, and
(3) a preformed stabilizer,
in the presence of
(4) a free-radical polymerization initiator,
and, optionally,
(5) a chain transfer agent,
wherein said polyol (1)(c) and polyol (1)(d) are alkoxylation products prepared in the presence of a double metal cyanide (DMC) catalyst,
in the presence of
(III) at least one blowing agent,
and
(IV) at least one catalyst;
wherein said foam is a flexible foam having an elongation of at least 50%.

4. The process of claim 3, wherein (II) said isocyanate-reactive component additionally comprises at least one conventional polyol component selected from the group consisting of polyether polyols, polyester polyols and mixtures thereof.

5. The process of claim 3, in which the foam is produced by a free-rise process.

6. The process of claim 3, in which the foam is produced in a closed mold.

7. The polyurethane foam of claim 1, wherein said natural oils of said base polyol (1)(d) do not naturally contain one or more hydroxyl groups prior to being hydroxylated.

8. The polyurethane foam of claim 1, wherein said base polyol (1)(c) comprises an alkoxylation product of castor oil.

9. The polyurethane foam of claim 1, wherein said base polyol (1)(d) comprises an alkoxylation product of a hydroxylated derivative of soybean oil.

10. The polyurethane foam of claim 1, wherein (3) said preformed stabilizer is free of natural oils and/or derivatives thereof.

11. The polyurethane foam of claim 1, in which the polymer polyol has a solids content of at least 20% by weight, based on the total weight of the polymer polyol.

12. The polyurethane foam of claim 1, in which the polymer polyol has a solids content of at least 30% by weight, based on the total weight of the polymer polyol.

13. The polyurethane foam of claim 1, wherein (2) said ethylenically unsaturated monomer of said polymer polyol comprises a mixture of styrene and acrylonitrile in a weight ratio of from about 8020 to about 40:60.

14. The process of claim 3, wherein said natural oils of said base polyol (1)(d) do not naturally contain one or more hydroxyl groups prior to being hydroxylated.

15. The process of claim 3, wherein said base polyol (1)(c) comprises an alkoxylation product of castor oil.

16. The process of claim 3, wherein said base polyol (1)(d) comprises an alkoxylation product of a hydroxylated derivative of soybean oil.

17. The process of claim 3, wherein (3) said preformed stabilizer is free of natural oils and/or derivatives thereof.

18. The process of claim 3, in which the polymer polyol has a solids content of at least 20% by weight, based on the total weight of the polymer polyol.

19. The process of claim 3, in which the polymer polyol has a solids content of at least 30% by weight, based on the total weight of the polymer polyol.

20. The process of claim 3, wherein (2) said ethylenically unsaturated monomer of said polymer polyol comprises a mixture of styrene and acrylonitrile in a weight ratio of from about 80:20 to about 40:60.

* * * * *